(12) United States Patent
Levin et al.

(10) Patent No.: US 8,599,384 B2
(45) Date of Patent: Dec. 3, 2013

(54) HANDHELD INTERFEROMETER BASED WAVELENGTH METER

(75) Inventors: Piotr Anatolij Levin, Vilnius (LT);
Aleksandr Stepanov, Vilnius (LT);
Vadam Gorchakov, Moscow (RU)

(73) Assignee: Lifodas, UAB, Vilnius (LT)

( * ) Notice: Subject to any disclaimer, the term of this patent is extended or adjusted under 35 U.S.C. 154(b) by 422 days.

(21) Appl. No.: 12/912,528

(22) Filed: Oct. 26, 2010

(65) Prior Publication Data

US 2011/0096335 A1 Apr. 28, 2011

Related U.S. Application Data

(60) Provisional application No. 61/279,788, filed on Oct. 26, 2009.

(51) Int. Cl.
*G01B 9/02* (2006.01)
*G01N 21/00* (2006.01)
*G01J 3/45* (2006.01)

(52) U.S. Cl.
USPC ............. 356/484; 356/72; 356/73; 356/451; 356/477

(58) Field of Classification Search
USPC .................. 356/450–458, 477–521
See application file for complete search history.

(56) References Cited

U.S. PATENT DOCUMENTS

| | | | |
|---|---|---|---|
| 6,389,046 B1 * | 5/2002 | Stayt et al. | 372/29.02 |
| 7,075,656 B2 * | 7/2006 | Hedin | 356/454 |
| 7,970,032 B2 * | 6/2011 | He | 372/38.08 |
| 8,031,331 B2 * | 10/2011 | Meier et al. | 356/4.01 |
| 2006/0132793 A1 * | 6/2006 | Ogawa | 356/484 |
| 2006/0221344 A1 * | 10/2006 | Masuda et al. | 356/451 |
| 2008/0170232 A1 * | 7/2008 | Buijs et al. | 356/455 |

* cited by examiner

*Primary Examiner* — Gregory J Toatley
*Assistant Examiner* — Hina F Ayub
(74) *Attorney, Agent, or Firm* — Michael J. Pesson; Catherine E. Nopjus; Lawson Pesson & Weldon-Francke, PC

(57) ABSTRACT

A handheld wavelength meter that includes a housing that encloses a non-stable reference signal source, an interferometer with rotating retroreflectors, optical-electrical converters, a frequency multiplier, and a controller.

17 Claims, 10 Drawing Sheets

HANDHELD INTERFEROMETER BASED WAVELENGTH METER

CLAIM OF PRIORITY

This application claims the benefit of priority of U.S. Provisional Patent Application Ser. No. 61/279,788, filed on Oct. 26, 2009.

FIELD OF THE INVENTION

The present invention relates to systems for measuring wavelengths of light and, in particular, to handheld devices for measuring wavelengths of light.

BACKGROUND OF THE INVENTION

There are many occasions in telecommunications, optical sensing and other applications when it is necessary to measure the wavelengths of beams of light. A variety of techniques have been devised to accomplish this purpose, but interferometric techniques have proven to be the most practical for wavelength measurement instrumentation. The basis of such techniques is the transformation of optical wavelengths to either a temporal or a spatial fringe frequency that is measured to high accuracy using a scale calibrated against a reference.

A typical Michelson interferometer generates wavelength information from the optical interference of two beams that originate from the same source. The incident beam is split between a fixed path and a varying path. Both beams are reflected back and recombined at the beamsplitter to produce a sinusoidal interference pattern that is a result of the changing phase relationship between the beams. The unknown wavelength of the incident light, $\lambda$, can be calculated using the Michelson interferometer equation $m\lambda=2nd$. In this equation, m is the number of fringes recorded as the scanning mirror of the Michelson interferometer moves through the distance, d. The refractive index, n, of the medium (typically air) between the mirrors of the interferometer is included to account for the difference between the physical path distance and the optical path distance. The accuracy of this wavelength calculation depends primarily on the precision with which the displacement of the scanning mirror is known. In order to obtain highly accurate wavelength measurements, a reference light source, such as a laser with a stable and accurately known wavelength, is measured simultaneously to determine the scanning mirror displacement in terms of the known wavelength.

Conventional interferometers are capable of producing very precise wavelength measurements. Unfortunately, these conventional interferometers have heretofore not been adaptable for use in portable wavelength measurement devices. This is due to two primary design limitations.

The first design limitation is that the perceived need for a highly stable reference light source has resulted in the use of large and expensive gas lasers as reference sources. Most benchtop wavelength measurement devices use HeNe lasers as a reference source. These lasers are very stable and have a wavelength that is typically two times shorter than the wavelength range used in telecommunication applications. However, HeNe lasers are not suitable for handheld instruments due to their large size and high level of power consumption.

The second design limitation that has prevented the use of interferometers in portable wavelength meters has been the manner in which the scanning mirror is displaced. In a typical Michelson interferometer, such as the interferometer described with reference to U.S. Pat. No. 4,383,762, the scanning mirror is displaced by a mechanical drive which causes the mirror to reciprocate either in translation or in oscillation. This reciprocating movement requires the use of a high precision bearing, which substantially increases the size, cost, and sensitivity of the interferometer to external movement. In addition, the requirement to displace the interferometer's scanning mirror at a substantially constant velocity requires the use of a servo control loop which also contributes to the size, complexity and expense of the interferometer. Further, the reciprocating motion also creates mechanical noise, requires considerable energy and gives rise to large momentum transfers to other instrument components, which must be counteracted in order to avoid measurement instability. Finally, the fact that these interferometers require the use of a fixed mirror located a distance away from the moving mirror increases the size of these interferometers to a point where they are not adapted for use in handheld wavelength meters. Thus, these types of interferometers are only adapted for use in benchtop type wavelength meters.

Another variation of a Michelson interferometer is shown in U.S. Pat. No. 6,124,929. This patent discloses a Michelson interferometer that replaces the reciprocal or translational motion of the moving mirror with a moving mirror that is rotated about a central axis. This arrangement avoids the mechanical noise and momentum transfers inherent in prior interferometers that rely upon a reciprocating motion. However, the device of U.S. Pat. No. 6,124,929 requires the use of a substantially stable reference source, such as a HeNe laser, and the use of a fixed mirror located a distance away from the moving mirror. Accordingly, it is likewise only adapted for use in benchtop type wavelength meters.

A number of handheld wavelength meters have been developed and marketed using non-interferometer based techniques. These meters typically operate using tunable filters. In these meters, the input light is collimated by a lens or concave mirror and then passed through the tunable filter. A photodetector is disposed behind a filter corresponding to a particular wavelength and detects when light of that wavelength passes through the filter. These meters do not require the use of a highly stable reference light or the movable mirrors of an interferometer. Accordingly, they are well adapted for use as portable battery-powered units. Unfortunately, these types of wavelength meters are not well suited to measuring broad spectrum systems for a number of reasons. First, they measure only in the 40 nm range. Moreover, acceptable resolution and accuracy, as required by the wavelength division multiplexing systems commonly used in telecommunications transmissions, are typically in the range of plus or minus 3.3 GHz or plus or minus 25 pm. These types of wavelength meters do not meet these standards. Finally, these types of wavelength meters take up to two minutes to take measurements through the 40 nm range, which is unacceptable in most applications.

Coarse wavelength division multiplexing (CWDM) is a form of wavelength division multiplexing that has wider spacing between wavelengths than dense wavelength division multiplexing (DWDM). CWDM uses a far broader photonic band spectrum than other such systems, which are often confined to one or two channels. Furthermore, up to eighteen wavelengths can be sent using some schemes of CWDM. Modern CWDM and DWDM systems require not only testing to determine if the channel exists and its power level, but also the exact transmitter wavelength, as it is important to make sure the wavelength is within a specified range and is not at the edge of the channel wavelengths. Because filter based meters are essentially "go, no-go" type detectors that will pass wavelengths within the entire channel range, they are not suited to producing the types of measurements that are required in these applications.

Therefore, there is a need for a highly accurate and precise, compact, handheld wavelength meter. In order to determine whether a wavelength is not at an edge of a channel, the precision should be from about a few pm to measuring exact transmission wavelengths. There is also a need for a handheld wavelength meter that can quickly scan, in approximately one second, a full wavelength range of 500 nm (1200-1700 nm) to find all optical channels existing in an optical fiber. There is also a need for a handheld wavelength meter that does not consume a large amount of power during operation and, consequently, provides a long battery life.

SUMMARY OF THE INVENTION

The present invention is a handheld wavelength meter for measuring the wavelength of a light signal. The wavelength meter includes a housing that may enclose a non-stable reference signal source, whose signal has a non-stable wavelength, an interferometer, optical-electrical converters, a frequency multiplier, and a controller.

The exterior of the housing is dimensioned to fit comfortably in the average human hand, and may include at least one fiber connector, a battery hatch, a power connector, at least one USB port, and a user interface, including a display screen and a keypad. At least one fiber connector extends preferably from the top of the housing of the wavelength meter, and is dimensioned for attachment to an optical fiber such that the wavelength of a light from the optical fiber may be measured by the wavelength meter. Any such light will be sent as an input signal to the interferometer disposed within the housing. The wavelength meter may include additional fiber connectors to perform functions of the wavelength meter beyond measuring wavelength, such as optical power measurement and visual fault location. These connectors may be omitted from embodiments of the wavelength meter that are intended to perform wavelength measurement functions alone.

The battery hatch is a removable section of the housing that may provide access to the battery disposed therein. The power connector is any art recognized connector available to connect one end of a wire to the wavelength meter such that the battery will recharge if the other end of the wire is provided with power. The power connector may be eliminated in favor of recharging the battery through a USB port.

One or more USB ports may be included on the housing, preferably on its side. The USB port is preferably a standard USB port that allows data to be transferred into and out of the wavelength meter. Some embodiments may utilize mini-USB ports, or different types of input/output ports. Some embodiments of the wavelength meter may include a wireless transceiver, such as a Bluetooth or cellular transceiver, which allows the wavelength meter to input and output data wirelessly.

The wavelength meter's user interface, which is positioned on the housing may include a display screen and a keypad. A display screen may be disposed within the top portion of the housing. The display is preferably an LCD that interfaces with the controller of the wavelength meter to display the measured wavelengths in table or graph form. It may also display other test results, fault messages and set-up parameters. In embodiments of the wavelength meter that perform other test functions in addition to wavelength measurement, the display is also adapted to display the results of such tests. A keypad may be disposed in the lower part of the housing and is adapted to allow the user to input certain measurement parameters into the wavelength meter and to control the display and the flow of data through the USB port(s). In addition, the keypad allows the user to name, store and recall files, set pass fail criteria, and otherwise control the operation of the wavelength meter.

The housing may enclose a battery, an optical isolator, a non-stable reference source, an interferometer, optical-electrical converters, a controller, a frequency multiplier, and a wireless transceiver. The battery is preferably a lithium ion or nickel metal hydride battery that may be charged multiple times without significant loss of charging capacity. However, other art recognized batteries may be substituted to achieve similar results. As discussed above, the battery may be charged by connection to a power source through either a power connector or a USB port.

The optical isolator is positioned such that a light signal introduced to the wavelength meter through the input signal fiber connector then passes through the optical isolator before entering the interferometer. The optical isolator is used to prevent reflection from the interferometer back to the input signal fiber connector.

The housing also encloses a non-stable reference signal source. The non-stable reference signal source emits a non-stable reference signal and a temperature related output signal. The non-stable reference signal has a non-stable wavelength and is preferably an unstabilized DFB laser, but may be any semiconductor laser, including a tunable DFB laser with gas cell stabilization. The temperature related output signal corresponds to the temperature of the non-stable reference signal. The wavelength of the non-stable reference signal is known at known temperatures, thus the wavelength of the non-stable reference signal may be determined by its temperature, indicated by the temperature related output signal. The non-stable reference signal passes from the non-stable reference signal source to the interferometer. The temperature related output signal passes from the non-stable reference signal source to the controller.

The preferred non-stable reference signal source also includes a light divider, an unfiltered photodiode, and a filtered photodiode. In this embodiment, the non-stable reference signal is transmitted onto a light divider, which divides the signal into a portion of the non-stable reference signal, a first measurement signal, and a second measurement signal. The first measurement signal is sent to an unfiltered photodiode, which measures the intensity of the first measurement signal. The second measurement signal is sent to a photodiode that includes a thin film filter with a known function of attenuation dependence from wavelength and from temperature and wavelength. The filtered photodiode measures the intensity of the second measurement signal after it has passed through the filter. In the preferred embodiment, each photodiode sends an intensity signal to the controller. Some embodiments, however, include a device that accepts the intensity signals from the photodiodes, calculates the attenuation based upon the intensity signals, and sends an attenuation signal to the controller. The controller takes the light intensity or filter attenuation and temperature signals, and calculates the wavelength of the non-stable reference signal source based upon the attenuation and temperature of the non-stable reference signal. This calculation is based upon known wavelength/temperature and wavelength/attenuation and temperature dependence data for the particular non-stable reference signal, such as a DFB laser, that is stored within the controller. Utilizing this embodiment, the wavelength of the non-stable reference signal may be measured to an accuracy of approximately 1 pm.

As discussed above, the preferred non-stable reference signal source includes both a temperature related output signal and a light divider, unfiltered photodiode, and filtered photodiode. In some embodiments, however, the non-stable reference signal source includes only a temperature related output signal. In still other embodiments, the non-stable reference signal source includes only a light divider, unfiltered photodiode, and filtered photodiode.

The wavelength meter housing also encloses an interferometer. The preferred interferometer includes a pair of retroreflectors that are moved by a motor disposed within an interferometer housing. The interferometer's housing is preferably made of a lightweight metallic material, such as aluminum, and is approximately two inches long, by two inches wide, by one half inch thick. In some embodiments, however, the housing may have other dimensions or be made of other materials. The preferred motor is a permanent magnet synchronous motor. In other embodiments, a conventional DC motor or brushed DC motor is used. Any motor or oscillator that can swing, rotate, or otherwise move the retroreflectors to create an angle may be used in the present invention. The motor is in communication with and rotates a pair of retroreflectors. The retroreflectors are disposed in a fixed angular relation to one another such that both retroreflectors may be rotated to be in the optical path of the input signal from the fiber connector and the reference signal from the non-stable reference signal source. The preferred retroreflectors are corner cube trihedral prisms or hollow retroreflectors, but other types of prisms with similar function may be substituted to achieve similar results. Moreover, other embodiments may include multiple sets of retroreflectors in order to increase the sampling rate of the wavelength meter.

The interferometer's housing also includes reference and input signal inputs. On the exterior of the interferometer housing, the reference signal input is connected to the non-stable reference signal source. Also on the exterior of the interferometer housing, the input signal input is connected to an optical isolator and the input signal fiber connector. In a first preferred embodiment, two optical-electrical converters are affixed to the exterior of the interferometer. The optical-electrical converters are positioned such that the input signal will travel to one optical-electrical converter after the input signal has traveled through the interior of the interferometer and the reference signal will travel to the other optical-electrical converter after the reference signal has traveled through the interior of the interferometer. In a second embodiment, the optical-electrical converters corresponding respectively to the input signal and the reference signal are not affixed to the exterior of the interferometer, but are instead connected to the interferometer through fiber. In the second embodiment, the present invention includes optical couplers that couple the fibers through which the signals will enter the interferometer from the input signal input and the reference signal input and the fibers through which the signals will leave the interferometer to travel to the optical-electrical converters.

In addition to the motor and retroreflectors, the interior of the interferometer includes two collimators, two optical ducts, an angled mirror, two fixed mirrors, and a cube beamsplitter. Although a cube beamsplitter is preferred, it is understood that a non-cubed beamsplitter may also be used. On the interior of the interferometer housing, the reference signal input is connected to one collimator, which is connected to one optical duct. Also on the interior of the interferometer housing, the input signal input is connected to the other collimator, which is connected to the same or a separate optical duct. That optical duct is positioned such that signals passing through it are reflected upward by the angled mirror through the other optical duct, and then onto a cube beamsplitter, which then splits the signals and directs them onto the retroreflectors.

The optical-electrical converters may be any commonly used in the art to convert light signals into electrical signals, such as photodiodes, phototransistors, or light sensitive resistors. They are preferably photodiodes that will measure light within the working wavelength range. For wavelengths between 1200 and 1700 nm, InGaAs photodiodes are preferred.

The operation of the wavelength meter of the first embodiment as described above is as follows. An input signal passes through the input signal fiber connector through the optical isolator and then through the interferometer's input signal input. Once within the interferometer, the input signal passes through one collimator, where it is collimated. Simultaneously, the non-stable reference signal source operates as described above, emitting a non-stable reference signal, a temperature related output signal, and two intensity signals. The optional temperature related output signal and two intensity signals travel to the controller. The non-stable reference signal passes through the interferometer's reference signal input. Once within the interferometer, the non-stable reference signal passes through the other collimator, where it is collimated. The collimated input and non-stable reference signals then pass through the first optical duct, are reflected upward by the angled mirror through the second optical duct, and then pass to the cube beam splitter, which then splits the signals and directs them onto the retroreflectors, which are rotating. The retroreflectors reflect the signals onto the fixed mirrors, which reflect the signals back to the retroreflectors, and then back to the cube beamsplitter where they reform new input and reference signals. The cube beamsplitter then splits the new input and reference signals, sending one new input signal back to the collimator through which the original input signal traveled, and sending one new reference signal back to the collimator through which the original reference signal traveled. The other new input and reference signals are passed back to the respective optical-electrical converters that are affixed directly to the exterior of the interferometer. The optical-electrical converters convert the optical signals into electrical signals and send them to the controller. In a preferred embodiment, the reference signal passes from its optical-electrical converter to the frequency multiplier that triples its frequency before passing onto the controller. This shortens the reference signal's wavelength such that it is shorter than the input signal's measurement range, which is preferable. In a variation on this first embodiment, output fibers with collimators are connected to optical-electrical converters.

The operation of the wavelength meter of the second embodiment as described above is as follows. An input signal passes through the input signal fiber connector through the optical isolator and an optical coupler and then through the interferometer's input signal input. Simultaneously, the non-stable reference signal source operates as described above, emitting a non-stable reference signal, a temperature related output signal, and two intensity signals. The temperature related output signal and two intensity signals travel to the controller. The non-stable reference signal passes through an optical coupler and then through the interferometer's reference signal input. Once within the interferometer, the non-stable reference signal passes through the other collimator, where it is collimated. The collimated input and non-stable reference signals then pass through the first optical duct, are reflected upward by the angled mirror through the second optical duct, and then pass to the cube beam splitter, which then splits the signals and directs them onto the retroreflectors, which are rotating. The retroreflectors reflect the signals onto the fixed mirrors, which reflect the signals back to the retroreflectors, and then back to the cube beamsplitter where they reform new input and reference signals. The cube beamsplitter then splits the new input and reference signals, sending one new input signal back to the collimator through which the original input signal travelled, and sending one new reference signal back to the collimator through which the original reference signal travelled. The other new input and reference signals are not used. The new signals pass back through their respective optical couplers and then to their respective optical-electrical converters. The optical-electrical converters convert the optical signals into electrical signals and send them to the controller. In a preferred embodiment, the reference signal passes from its optical-electrical converter to the frequency multiplier that triples its frequency before passing onto the controller. This shortens the reference signal's wavelength such that it is shorter than the input signal's measurement range, which is preferable.

The controller uses the temperature related output signal, the intensity signals, and the reference signal to determine the wavelength of the reference signal. The controller then takes discrete measurements of the input signal at reference period distances corresponding to when the reference channel sinusoidal signal crosses a zero line. In this manner, the controller reconstructs the input signal's spectrum using a Fourier transform. The controller's results may be displayed on the display screen on the wavelength meter. Operation in this manner may provide exact transmission wavelengths of the input signal in about one second.

Therefore, it is an aspect of the invention to provide a handheld wavelength meter that utilizes an interferometer.

It is a further aspect of the invention to provide a handheld wavelength meter that does not require the use of a highly stable light source.

It is a further aspect of the invention to provide a handheld wavelength meter that utilizes a low cost highly reliable DFB laser as a reference source.

It is a further aspect of the invention to provide a handheld wavelength meter for use in telecommunications applications that is capable of utilizing a DFB laser in the range of 1270 nm to 1700 nm as a reference source.

It is a further aspect of the invention to provide a handheld wavelength meter that utilizes a DFB reference source that produces light having a wavelength that is within the range of the wavelengths of light that the wavelength meter is designed to measure.

It is a further aspect of the invention to provide a handheld wavelength meter that includes a compact, inexpensive mechanism for moving the mirrors and/or retroreflectors that will not be impacted by the handheld nature of the meter.

It is a further aspect of the invention to provide a handheld wavelength meter that has a faster response time than conventional handheld filter based meters.

It is a further aspect of the invention to provide a handheld wavelength meter that does not consume a large amount of power during operation.

It is a further aspect of the invention to provide a handheld wavelength meter that is capable of measuring exact transmission wavelengths.

These aspects of the invention are not meant to be exclusive and other features, aspects, and advantages of the present invention will be readily apparent to those of ordinary skill in the art when read in conjunction with the following description and accompanying drawings.

DETAILED DESCRIPTION OF THE INVENTION

Figure 1:
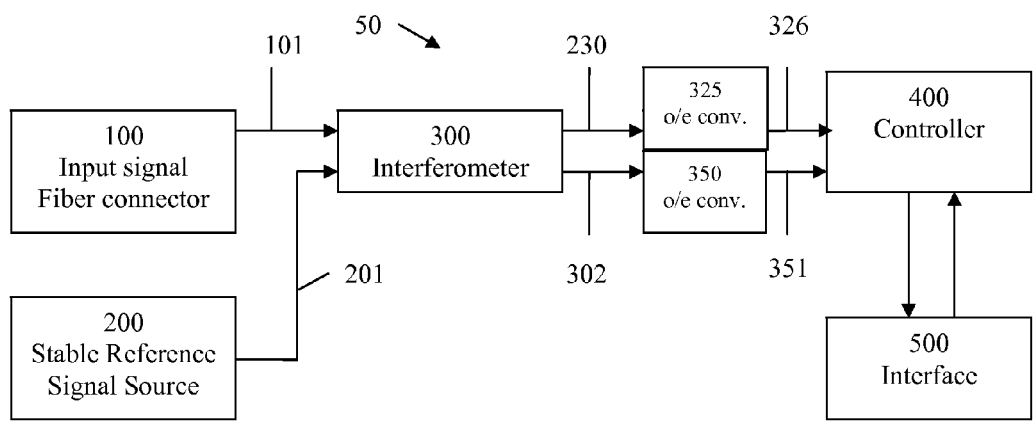
FIG. 1 is a block diagram of a prior art wavelength meter.

Referring first to FIG. 1, a block diagram of a prior art wavelength meter 50 is shown. The prior art wavelength meter includes an input signal fiber connector 100, which is typically a fiber optic connector that connects the prior art wavelength meter 50 to a fiber optic cable through which the signal to be measured is passed, and a stable reference signal source 200. The stable reference signal source 200 is a laser light source, typically a HeNe laser, which transmits an optical signal at a known wavelength that does not vary more than 1 pm.

The input signal fiber connector 100 and the stable reference signal source 200 are placed in optical connection with an interferometer 300 using conventional fiber optic connectors. The interferometer 300 is typically a Michelson interferometer, which accepts the input signal 101 from the input signal fiber connector 100 and the stable reference signal 201 from the stable reference signal source 200 and produces optical outputs 230, 302 corresponding to the fringe patterns for each signal 101, 201, respectively. The optical outputs 230, 302 are sent to optical-electrical converters 325, 350, which convert the optical outputs 230, 302 into electrical signals 326, 351. These electrical signals 326, 351 are then fed into controller 400, which includes a signal processing unit programmed to calculate a Fourier transform of the spectrum of the input signal 101 under test in order to determine the wavelengths existing in the input signal 101. The controller 400 then communicates with an interface 500, which may be a human and/or computer interface for test results display, storage and additional use.

Figure 2:
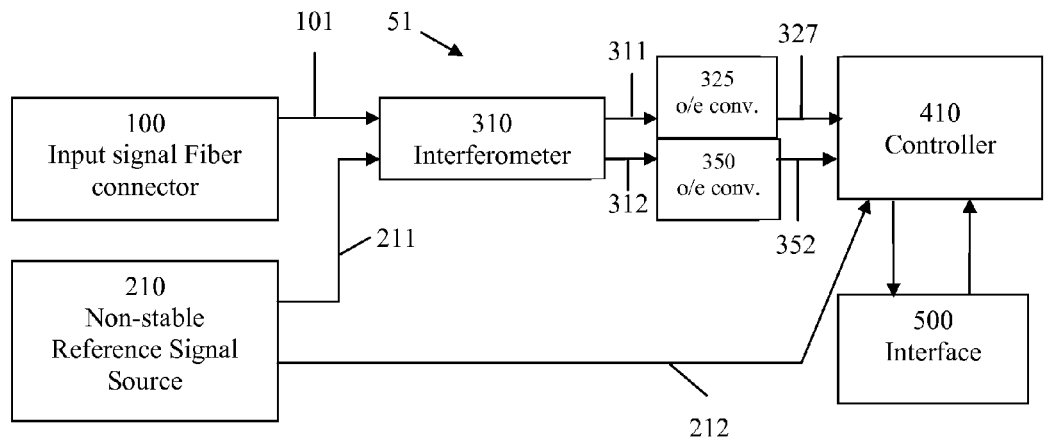
FIG. 2 is a block diagram of one embodiment of the portable wavelength meter of the present invention.

Referring next to FIG. 2, wavelength meter 51, which is one embodiment of the present invention, is described. The wavelength meter 51 includes an input signal fiber connector 100. The input signal fiber connector 100 passes an input signal 101 into an interferometer 310, which also accepts a non-stable reference signal 211 from a non-stable reference signal source 210, and outputs light signals 311, 312 to optical-electrical converters 325, 350, which convert the light signals 311, 312 into electrical signals 327, 352, which are sent to controller 410. Control 410 also accepts a temperature related output signal 212, discussed with reference to FIG. 3 below. The controller 410 then communicates with an interface 500, which may be a human and/or computer interface for test results display, storage and additional use.

Because the non-stable reference signal 211 is produced by a non-stable reference signal source 210, preferably a DFB laser, the wavelength of the non-stable reference signal 211 must be determined in order for the non-stable reference signal 211 to serve as an acceptable reference for the interferometer 310.

Figure 3:
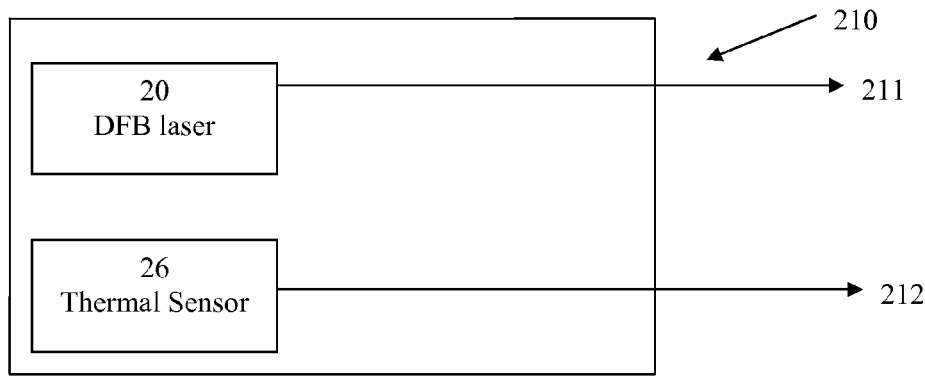
FIG. 3 is a block diagram of a basic embodiment of the non-stable reference signal source of the portable wavelength meter of the present invention.

As shown in FIG. 3, the non-stable reference signal source 210 includes a semiconductor DFB laser 20 that produces non-stable reference signal 211 and a thermal sensor 26 that measures the temperature of the DFB laser 20 and produces a temperature related output signal 212 corresponding to the temperature of the DFB laser 20. The DFB laser 20 is preferably an unstabilized DFB laser, but it may be any semiconductor laser, including tunable DFB lasers with gas cell stabilization.

The temperature related output signal 212 is sent to the controller 410, which calculates the wavelength of the non-stable reference signal 211 based upon the temperature of the DFB laser 20. This calculation is based upon known wavelength/temperature dependence data for the non-stable reference signal source 210. This data is stored within the controller 410. This data is preferably obtained by placing the DFB laser 20 and the thermal sensor 26 into a temperature chamber, changing the temperature in the temperature chamber, measuring the temperature and the wavelength of the light at each temperature, and writing and storing the corresponding temperatures and wavelengths. The result is a table which may be loaded into controller 410 to calculate wavelength from known temperature.

Figure 4:
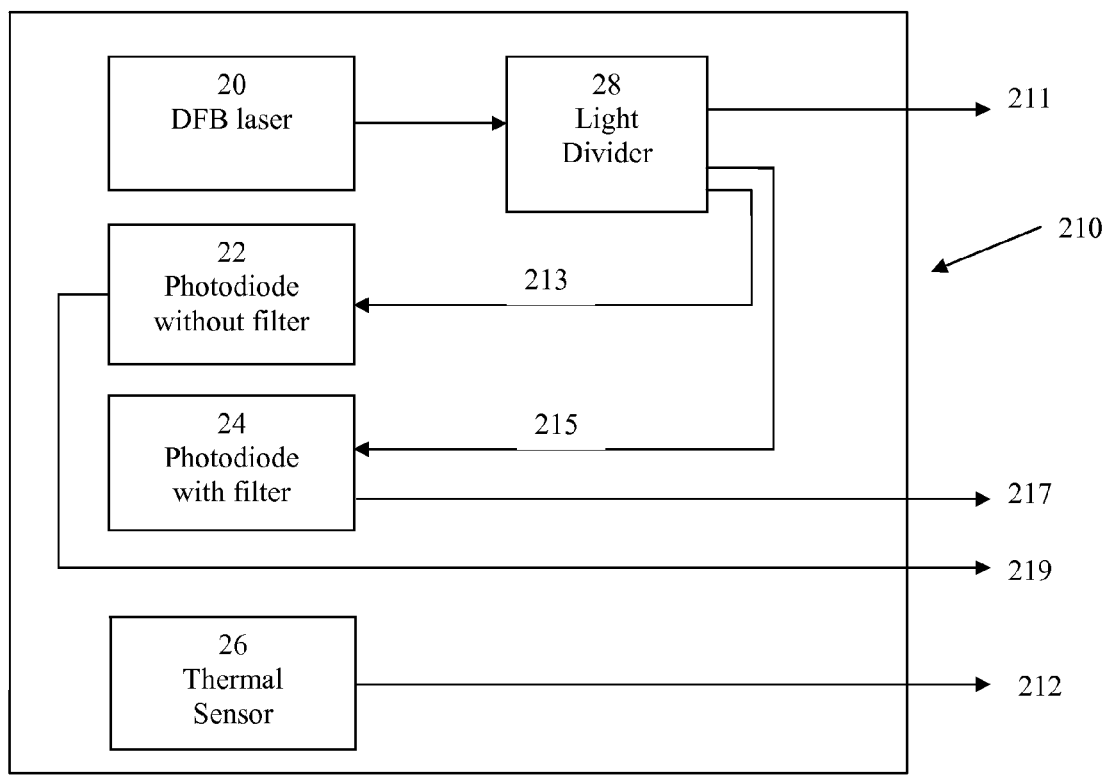
FIG. 4 is a block diagram of a preferred embodiment of the non-stable reference signal source of the portable wavelength meter of the present invention.

Now referring to FIG. 4, the preferred embodiment of non-stable reference source 210 is shown. The wavelength of the non-stable reference signal 211 from the non-stable reference signal source 210 is calculated based upon temperature and attenuation of the non-stable reference signal 211. In this embodiment, the DFB laser 20 is transmitted onto a light divider 28, which divides the beam into a portion of the DFB laser 20, or non-stable reference signal 211, a first measurement signal 213 and a second measurement signal 215. The first measurement signal 213 is sent to a photodiode 22 that does not include a filter and measures the intensity of the first measurement signal 213. The second measurement signal 215 is sent to a photodiode 24 that includes a thin film filter with a known function of attenuation dependence from wavelength and from temperature and wavelength. This filtered photodiode 24 measures the intensity of the second measurement signal 215 after it has passed through the filter. In the preferred embodiment, each photodiode 22, 24 sends an intensity signal 219, 217 to the controller 410, although some embodiments include a device (not shown) that accepts the intensity signals 219, 217 from the photodiodes, 22, 24, calculates the attenuation based upon the intensity signals 219, 217 and sends an attenuation signal to the controller 410. The thermal sensor 26 measures the temperature of the DFB laser 20 and produces a temperature related output signal 212 corresponding to the temperature of the DFB laser 20, which is sent to the controller 410. The controller 410 takes the light intensity or filter attenuation and temperature signals and calculates the wavelength of the non-stable reference signal 211 based upon the attenuation and temperature of the DFB laser 20. This calculation is based upon known wavelength/temperature and wavelength/attenuation and temperature dependence data for the non-stable reference signal source 210 that is stored within the controller 410. This data is obtained in a similar manner to that describe above with reference to FIG. 3 except that, in addition to wavelength versus temperature, the data also includes attenuation versus temperature. Utilizing the embodiment of FIG. 4, the wavelength of the non-stable reference signal 211 may be measured to an accuracy of approximately 1 pm.

It is noted that, in some embodiments, the light divider 28 is a wavelength dependent optical or fiber optic coupler or beamsplitter with a known function of attenuation dependence from wavelength and from temperature and wavelength, and the filtered photodiode 24 is replaced with a second unfiltered photodiode. In such embodiments, the light divider 28 splits the light from the DFB laser 20 into a portion of DFB laser 20, or non-stable reference signal 211, non-wavelength dependent first measurement signal 213 and wavelength dependent second measurement signal 215. The intensity of each signal is then measured by photodiode 22 and the second unfiltered photodiode, and the wavelength of the non-stable reference signal 211 is then determined in the same manner as set forth above with reference to FIG. 4.

The interferometer 310 is preferably the rotating interferometer shown in FIGS. 5A, 5B, 6A, and 6B, which includes a pair of retroreflectors 32, 33 that are rotated by a motor 41. The use of a rotating interferometer is preferred due to its simplicity, low cost, mechanical stability and low mechanical noise.

The preferred interferometer includes a substantially hollow housing 39 having an optics portion 48, within which the fixed optical components of the interferometer 310 are disposed, and a motor portion 44, within which a central motor 41 is attached. The housing 39 is preferably manufactured of a lightweight metallic material, such as aluminum, and is approximately two inches long, by two inches wide, by one half inch thick. However, it is recognized that housings having other dimensions, or manufactured from other materials, may be substituted.

The preferred motor 41 is a permanent magnet synchronous motor. Motor 41 moves retroreflectors 32, 33 so that an angle is created between the various positions of the retroreflectors 32, 33. This movement may be rotation or merely swinging. When the movement is rotation, the speed of rotation may be constant or non-constant.

Figure 5A:
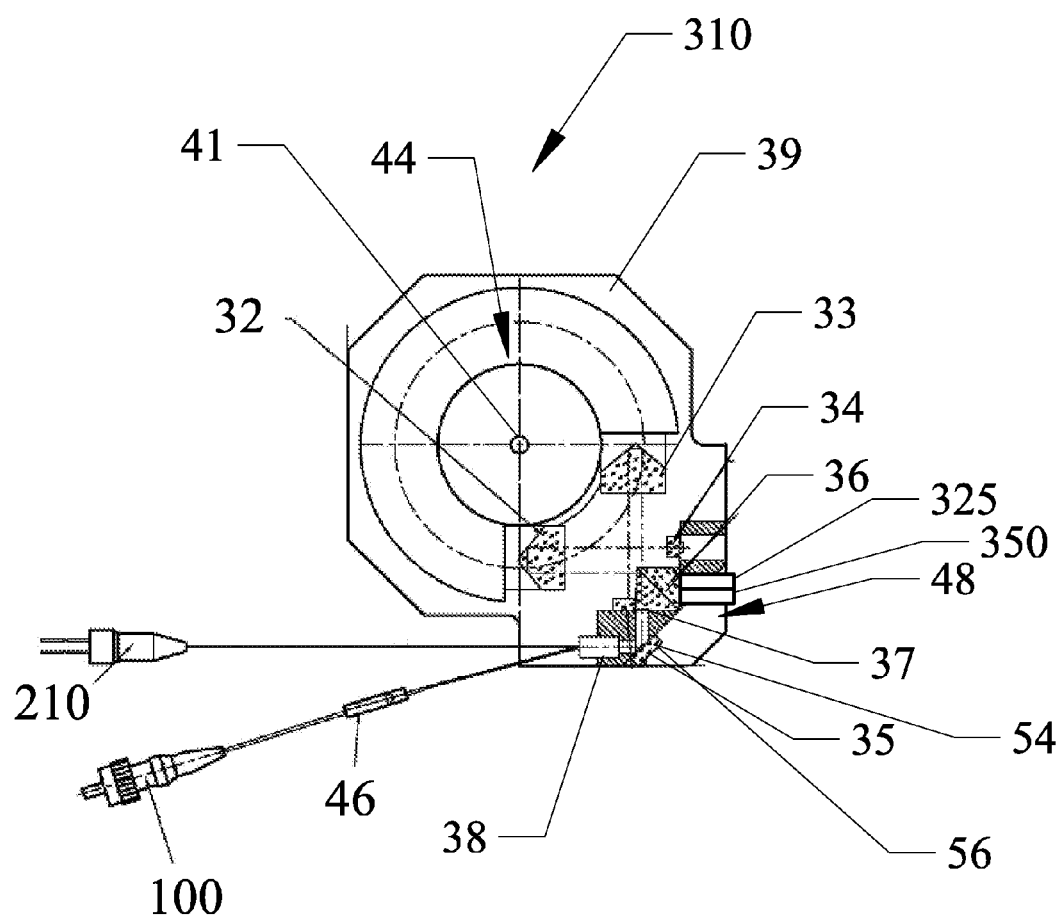
FIG. 5A is a top schematic diagram of a first preferred embodiment of the interferometer and optical inputs of the preferred portable wavelength meter of the present invention with the housing of the interferometer cut away to show the internal optics disposed therein.
Figure 5B:
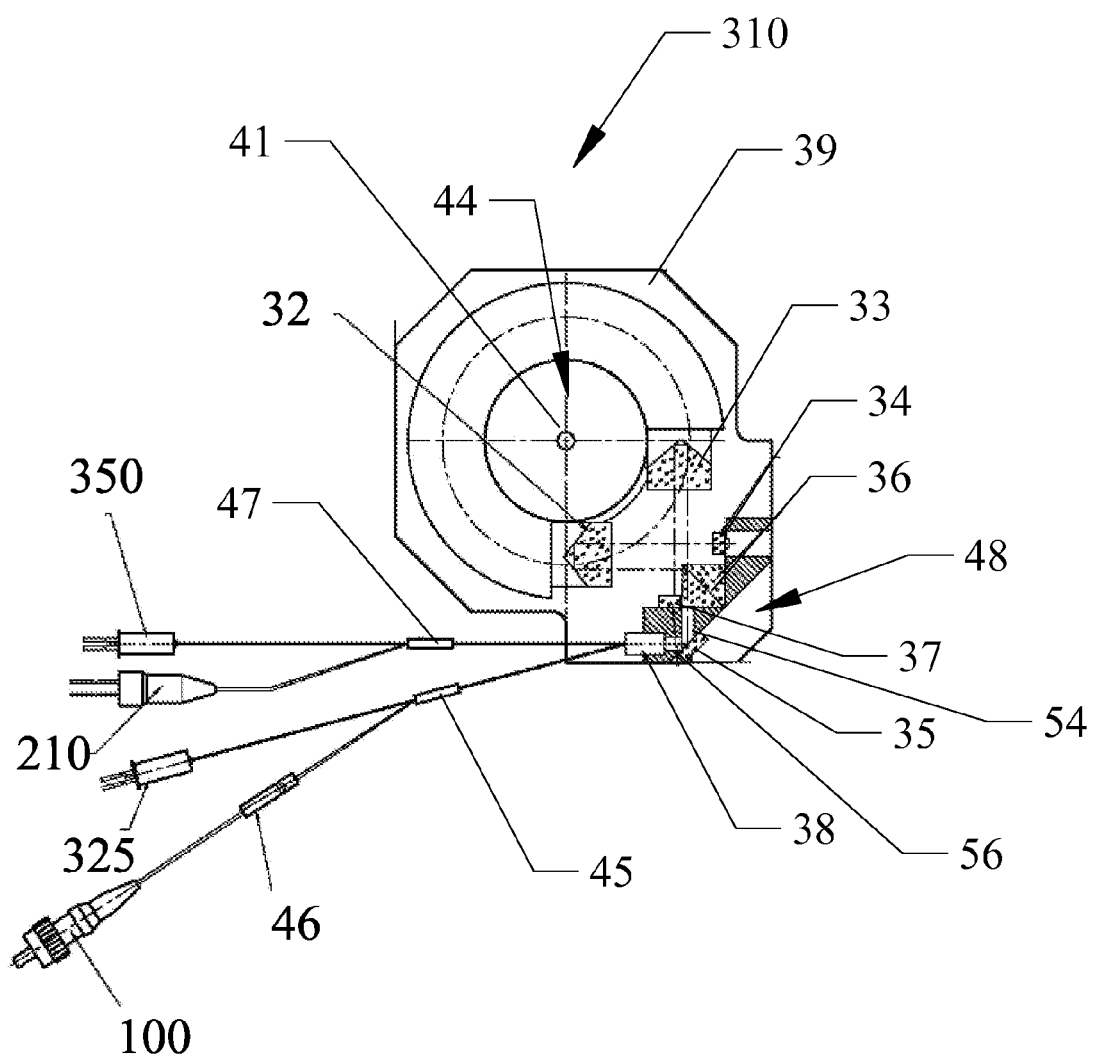
FIG. 5B is a top schematic diagram of a second preferred embodiment of the interferometer and optical inputs of the preferred portable wavelength meter of the present invention with the housing of the interferometer cut away to show the internal optics disposed therein.

A pair of retroreflectors 32, 33 are in communication with the motor 41 and are moved thereby. The retroreflectors 32, 33 are disposed in a fixed angular relation to one another such that both retroreflectors 32, 33 are in the optical path of the input signal and reference signal when they are rotated to the measurement location shown in FIGS. 5A and 5B. The preferred retroreflectors 32, 33 are corner cube trihedral prisms or hollow retroreflectors, but other types of prisms with similar function may be substituted to achieve similar results. Further, although the embodiments of FIGS. 5A and 5B show a single set of retroreflectors 32, 33, other embodiments may include multiple sets of retroreflectors in order to increase the sampling rate of the wavelength meter 51. For example, a wavelength meter 51 having two sets of retroreflectors will take two measurements per rotation rather than one, and a meter having four sets will take four measurements per rotation.

Figure 6A:
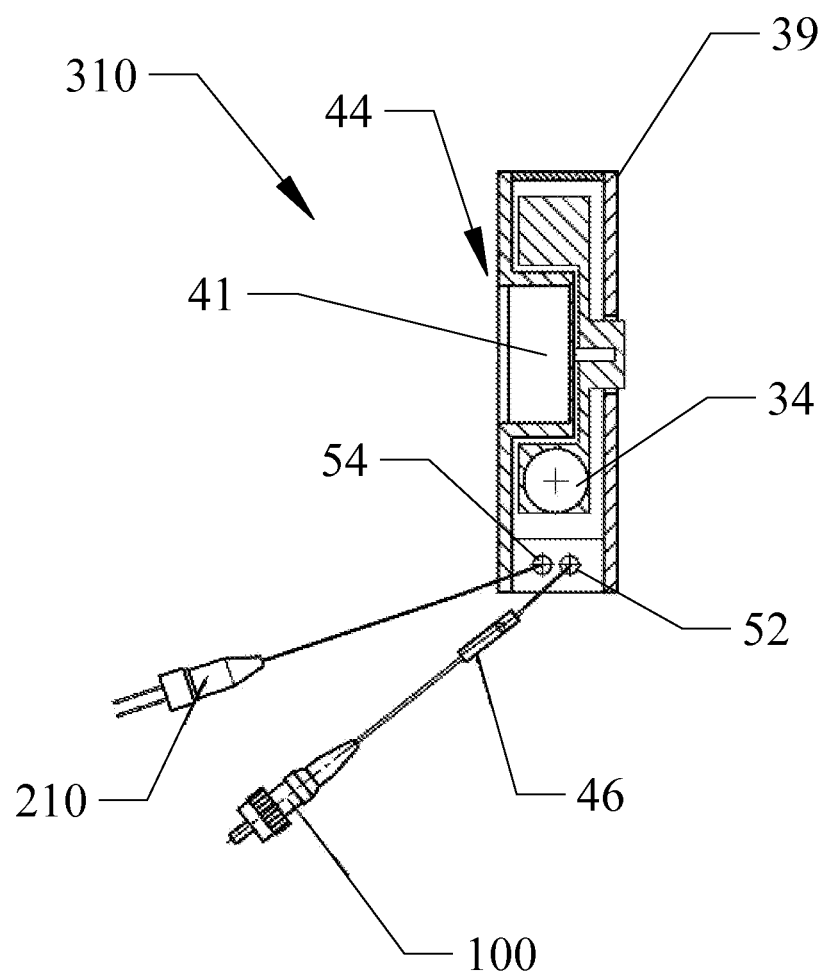
FIG. 6A is a side schematic diagram of the interferometer and optical inputs of the first preferred portable wavelength meter of FIG. 5A.
Figure 6B:
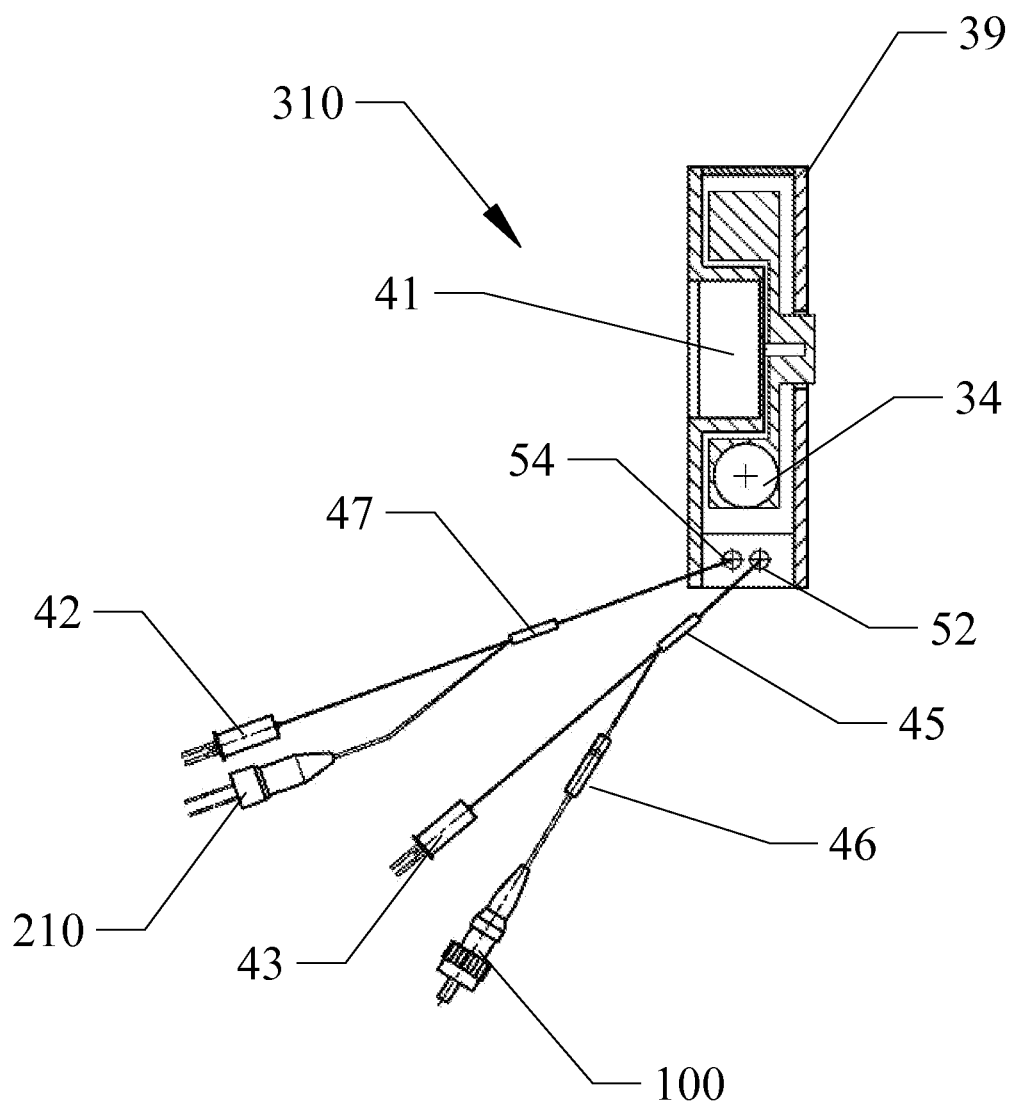
FIG. 6B is a side schematic diagram of the interferometer and optical inputs of the second preferred portable wavelength meter of FIG. 5B.
Figure 7A:
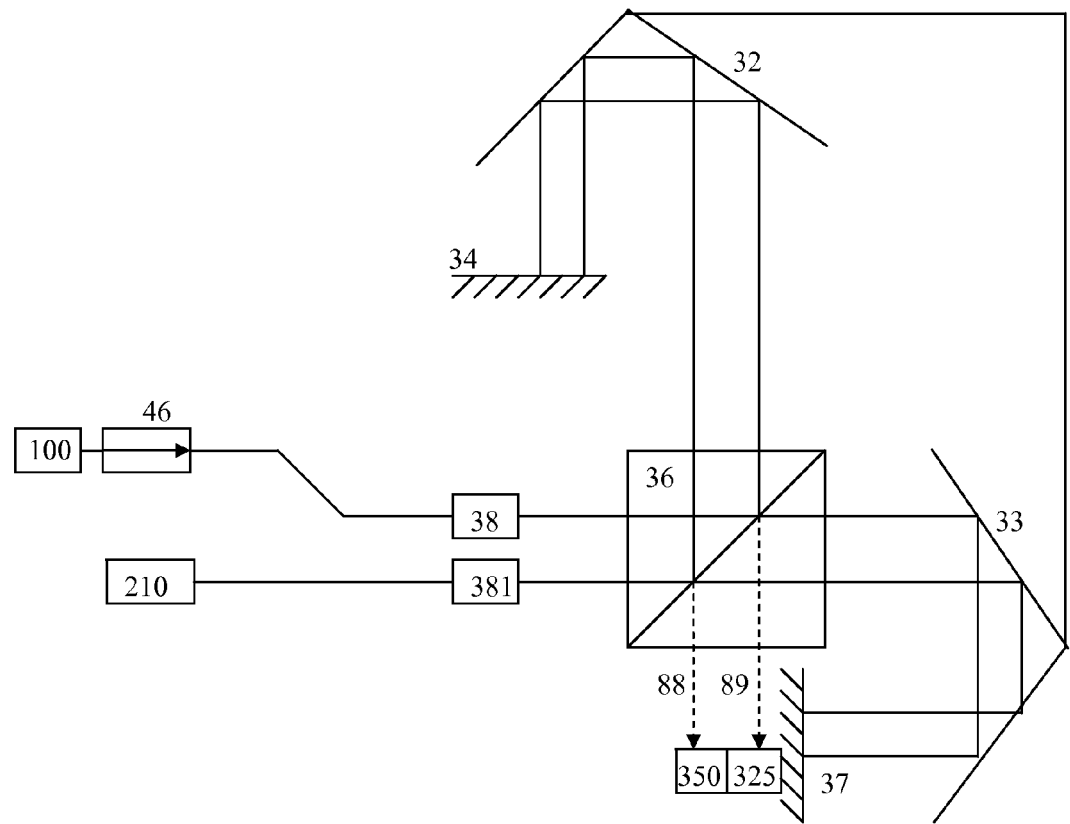
FIG. 7A is a schematic diagram showing the operation of the first preferred interferometer.
Figure 7B:
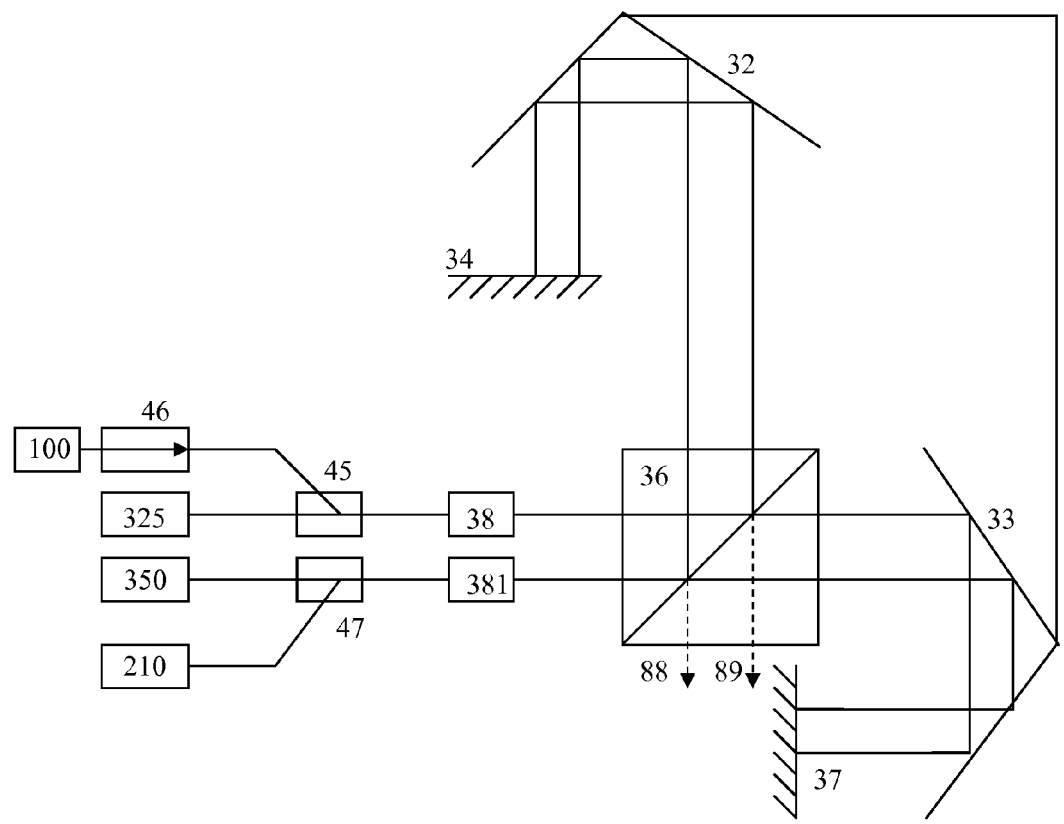
FIG. 7B is a schematic diagram showing the operation of the second preferred interferometer.

The optics portion 48 of the housing 39 is disposed adjacent to the motor portion 44 and includes the signal inputs 52, 54 and the fixed optical components of the interferometer 310. Non-stable reference channel signal input 54 is in communication with the non-stable reference signal source 210 and input channel signal input 52 is in communication with the input signal fiber connector 100. Optical isolator 46 is discussed in reference to FIGS. 7A and 7B, but included in FIGS. 5A and 5B for accuracy. The signal inputs 52, 54 direct the non-stable reference and input signals through a collimator 38, which align the signals such that both signals are travelling in a parallel path. It is noted that FIGS. 5A and 5B only show one collimator 38, but that the optics portion includes one collimator for each channel, or a total of two collimators. The signals then pass through a first optical duct 56 and are reflected upward by an angled mirror 35 through a second optical duct 55 into a cube beamsplitter 36 which splits the signals and directs them to the retroreflectors 32, 33. Mirrors 34, 37 are disposed relative to the retroreflectors 32, 33 such that the signals reflected from the retroreflectors 32, 33 are reflected back to the retroreflectors 32, 33. In the first preferred embodiment, as depicted in FIGS. 5A, 6A, and 7A, the signals are then reflected to optical-electrical converters 325, 350. In this first preferred embodiment, optical-electrical converters 325, 350 are positioned directly adjacent to the exterior of interferometer 310 so that the signals proceed directly into optical-electrical converters 325, 350 without passing through further fibers outside of housing 39 of interferometer 310. Thus, in the first preferred embodiment, optical-electrical converters 325, 350 are not visible in FIG. 6A on the exterior of interferometer 310. In a variation on this first embodiment (not shown), output fibers with collimators are connected to optical-electrical converters 325, 350. In the second preferred embodiment, as depicted in FIGS. 5B, 6B, and 7B, the signals are then reflected back through the same optical path from which the signals came and out through the input channel signal input 52 and the non-stable reference channel signal input 54. The signals then pass through optical couplers 45, 47 which direct the signals back to optical-electrical converters 325, 350. Thus, in the second preferred embodiment, optical-electrical converters 325, 350 are visible in 6B as being outside of the housing 39 of interferometer 310 and connected to the inside of interferometer 310 through fiber.

In either the first or second preferred embodiment, optical-electrical converters 325, 350 convert the light signals into electrical signals that may be sent to the controller 410 (not shown) for processing. Optical-electrical converters 325, 350 are preferably photodiodes that will measure light within the working wavelength range. For wavelengths between 1200 to 1700 nm, InGaAs photodiodes are preferred. However, any other sensitive photodiodes, phototransistors or light sensitive resistors may be used. Although photodiodes are presented as the preferred optical-electrical converters, it is understood that any optical-electrical converters commonly used in the art may be used with the present invention.

Referring now to FIGS. 7A and 7B, the operation of the first and second preferred interferometers 310 are shown. The operation defines an optical path of the input and non-stable reference signals. An optical signal passes through input signal fiber connector 100 and through optical isolator 46. Optical isolator 46 is used to prevent reflection from interferometer 310 back to input signal fiber connector 100. In the first preferred embodiment, shown in 7A, the optical signal then travels to collimator 38, which collimates the beam. In the second preferred embodiment shown in 7B, the optical signal then travels through optical coupler 45 to collimator 38, which collimates the beam. In either the first or second embodiment, the collimated beam passes to cube beamsplitter 36 and splits into two more or less equal beams, which go to retroreflectors 32, 33. Retroreflectors 32, 33 reflect the beams to mirrors 34, 37, respectively. Mirrors 34, 37 reflect the beams back to retroreflectors 32, 33, which then reflect the beams back to cube beamsplitter 36. The two beams from the two retroreflectors 32, 33 arrive at the same time to the same point on the cube beamsplitter 36 to create a new beam. Cube beamsplitter 36 then divides this new beam into two beams. In the first preferred embodiment as shown in FIG. 7A, one of the new beams goes to fiber through the same pathway through which it came and is not used in the interferometer, and the other new beam 89 goes directly to optical-electrical converter 325, which converts it to an electrical signal. In the second preferred embodiment as shown in FIG. 7B, one of the new beams goes to fiber through collimator 38, and the other new beam 89, is not used in the interferometer. In the second preferred embodiment, interferometer output from the collimator 38 comes to optical coupler 45 and then to optical-electric converter 325, which converts it to an electrical signal. In either the first or second embodiment, the point where the two beams from the retroreflectors 32, 33 come together at cube beamsplitter 36 may not coincide with the point where the original beam came from collimator 38, as is depicted in FIGS. 7A and 7B.

The non-stable reference channel signal path runs in close proximity to the input channel signal path, but the respective signals that run through them do not mix. Non-stable reference signal source 210 is a non-stable light source that emits laser light that travels through optical coupler 47 to collimator 381, which collimates the beam. The collimated beam passes to cube beamsplitter 36 and splits into two more or less equal beams, which go to retroreflectors 32, 33. Retroreflectors 32, 33 reflect the beams to mirrors 34, 37, respectively. Mirrors 34, 37 reflect the beams back to retroreflectors 32, 33, which then reflect the beams back to cube beamsplitter 36. The two beams from the two retroreflectors 32, 33 arrive at the same time to the same point on the cube beamsplitter 36 to create a new beam. Cube beamsplitter 36 then divides this new beam into two beams. In the first preferred embodiment as shown in FIG. 7A, one of the new beams goes to fiber through the same pathway through which it came and is not used in the interferometer, and the other new beam 88 goes directly to optical-electrical converter 350, which converts it to an electrical signal. In the second preferred embodiment as shown in FIG. 7B, one of the new beams goes to fiber through collimator 381, and the other new beam 88, is not used in the interferometer. In the second preferred embodiment, interferometer output from the collimator 381 comes to optical coupler 47 and then to optical-electric converter 350, which converts it to an electrical signal.

By making discrete measurements of the signal at many positions during the revolutions of the moving retroreflectors 32, 33, the spectrum can be reconstructed using a Fourier transform. However, it is necessary to make these discrete measurements at periods of equal distance between the positions. In the rotating interferometer 310 of the present invention, the distance between these positions is not linear in time scale. To solve this problem, the reference channel is used. When the reference channel has a wavelength that is no less than two times lower than the measurement range of the signal to be measured, it is enough to take discrete measurements of the input signal at each reference channel period distance. In practice, discrete measurements are taken when the reference channel sinusoidal signal crosses a zero line.

In embodiments in which the wavelength of the reference channel is within the input signal measurement range, a reference channel light interference signal does not cross zero frequently enough. As described below with reference to FIG. 8, this is solved by putting frequency multiplier 375 after the reference channel's optical-electrical converter 350. In such embodiments, the frequency multiplier 375 preferably multiplies the reference channel interference frequency by three to avoid even harmonic in spectrum. This is more than adequate to make the Fourier transform. Thus, once the reference channel frequency is multiplied, it comes to the controller 410 with periods of equal distance, at which the controller 410 may take data samples of the signal to be measured, which comes directly to the controller 410 from optical-electrical converter 325.

Regardless of whether the frequency of the reference signal is multiplied, after data is collected, the controller 410 calculates a fast Fourier transform to obtain a spectrum of the signal under test. The horizontal scale of the test results depends on the real reference channel wavelength. It can be calculated from data from the non-stable reference signal source 210, namely from thermal sensor 26 and/or intensity signals 219, 217 from photodiodes 22, 24. Once the real reference signal wavelength is known, the calculation is made in the same manner as with conventional Michelson interferometers. The sought input signal spectrum is Fourier transform data that is scaled according to the real reference source wavelength value. This spectrum is displayed or transmitted by interface 500 as test results.

The preferred embodiment of the wavelength meter 51 of the present invention utilizes an inexpensive 1550 nm DFB laser for the non-stable reference signal source 210. Such lasers have heretofore not been used as reference channels in wavelength meters in connection with telecommunications applications because these applications require transmissions in the range of between 1200 nm and 1700 nm, and the reference signal is preferably shorter than the measured wavelength. Accordingly, it was assumed expensive lasers that transmit at less than 1200 nm must be used. The inventor overcame this problem by utilizing the arrangement shown in FIG. 8.

Figure 8:
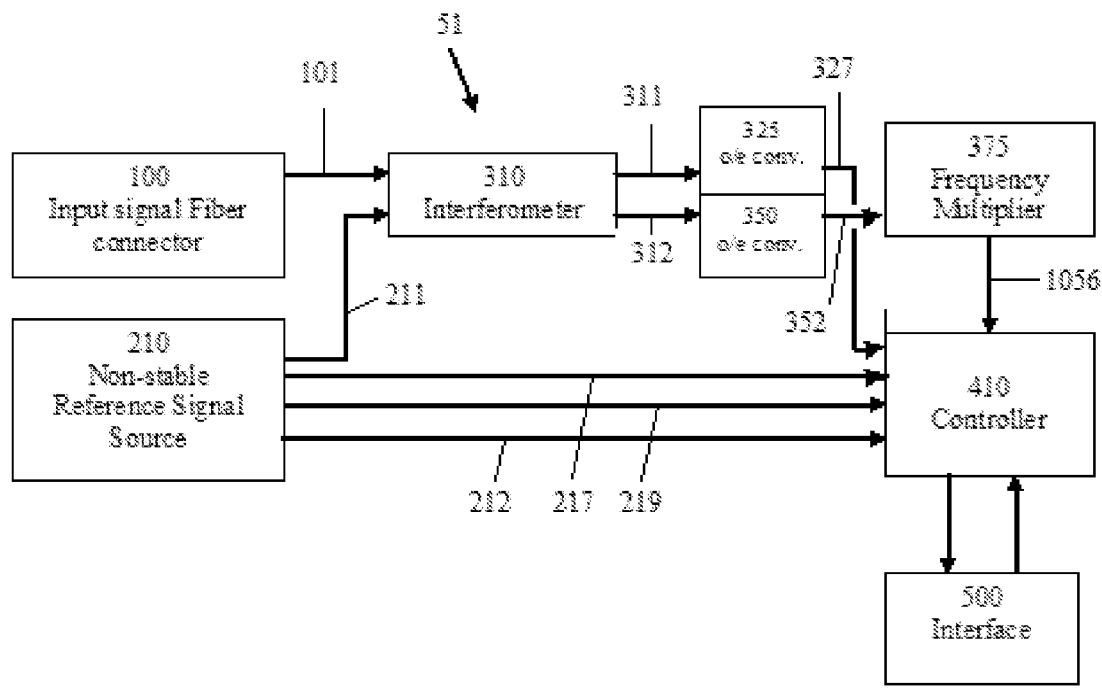
FIG. 8 is a block diagram of the preferred embodiment of the portable wavelength meter of the present invention.

The preferred embodiment of FIG. 8 utilizes the preferred non-stable reference signal source 210, as described in reference to FIG. 4, and all of the same components as described with reference to FIG. 2, but adds a frequency multiplier 375 between the optical-electrical converter 350 and the controller 410. The frequency multiplier 375 is preferably an integrated circuit that triples the frequency of the reference electrical signal 352 from the interferometer 310, which shortens the reference signal's wavelength, so that it is not within the measurement range of the signal to be tested. Measurement electrical signal 327 travels directly from optical-electrical converter 325 to controller 410. The tripled reference electrical signal 1056 then travels to controller 410. The ON Semiconductor 74HC4046 Phase Lock Loop may be used to multiply frequency, for example.

Figure 9:
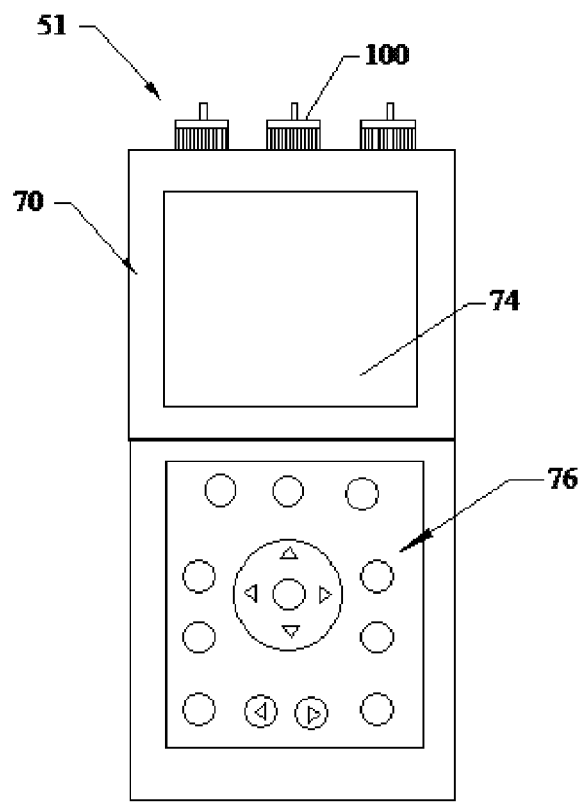
FIG. 9 is a front view of one embodiment of the portable wavelength meter of the present invention.
Figure 10:
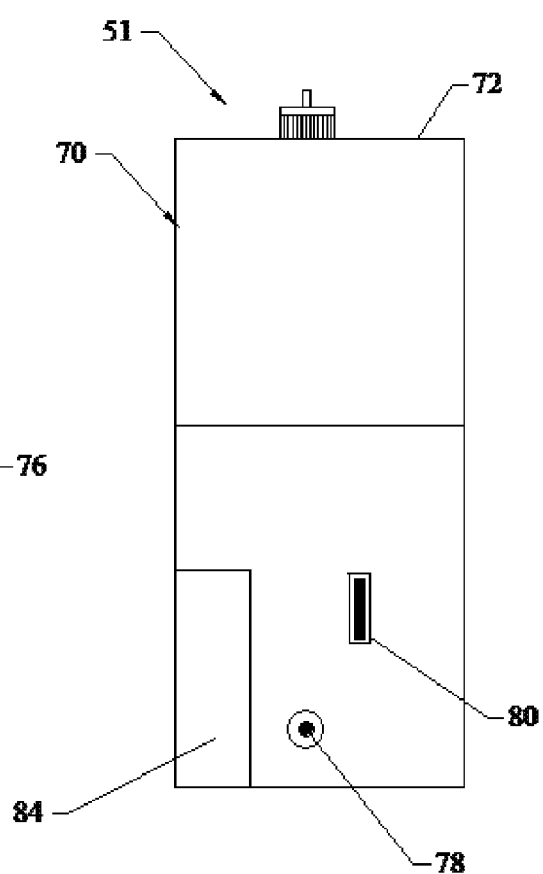
FIG. 10 is a side view of the embodiment of the portable wavelength meter of FIG. 9 with the thickness increased to enhance the details of the meter.

FIGS. 9 and 10 show one embodiment of the handheld wavelength meter 51 of the present invention. The wavelength meter 51 includes a housing 70, preferably manufactured of a plastic material, which is dimensioned to fit within a hand of a user. The input signal fiber connector 100 preferably extends from the top of the surface 72 of the housing 70 and is adapted for connection to an industry standard fiber optic cable connector (not shown). The non-stable reference source 210, interferometer 310 and controller 410 are mounted within the housing 70 and are not visible to the user.

The wavelength meter 51 of FIGS. 9 and 10 is designed to perform other test functions, such as optical power measurement and visual fault location, in addition to wavelength measurement. Accordingly, two additional fiber connectors extend from the top of the surface 72 of the housing and are connected to components within the housing 70 that are adapted to perform these test functions. However, it is recognized that these connectors are omitted from embodiments of the invention that are intended to perform only wavelength measurement functions.

A display 74 is disposed within the top portion of the housing 70. The display 74 is preferably an LCD that interfaces with the controller 410 to display the measured wavelengths in table or graph form, other test results, fault messages and set-up parameters. In embodiments of the wavelength meter 51 that perform other test functions in addition to wavelength measurement, the display is also adapted to display the results of such tests.

An input device, preferably a keypad 76, is disposed in the lower part of the housing 70 and is adapted to allow the user to input certain measurement parameters into the wavelength meter 51 and to control the display 74 and the flow of data through USB port 80. In addition, the keypad 76 allows the user to name, store and recall files, set pass fail criteria, and otherwise control the operation of the wavelength meter 51.

USB port 80 is preferably disposed on the side of the housing 70. This USB port 80 is preferably a standard USB port that allows data to be transferred into and out of the wavelength meter 51. However, some embodiments utilize mini-USB ports, or different types of input/output ports. Some embodiments of the wavelength meter 51 include a wireless transceiver, such as a Bluetooth or cellular transceiver, which allows the wavelength meter 51 to input and output data wirelessly.

The wavelength meter 51 preferably includes a rechargeable battery 84 and a power input connector 78 for charging the battery. The battery 84 is preferably a lithium ion or nickel metal hydride battery that may be recharged multiple times without a significant loss of charging capacity. However, other art recognized batteries may be substituted to achieve similar results. The power input connector 78 may take many forms and is shown in FIG. 10 as a round pin type connector. It is noted that the power input connector 78 is omitted from some embodiments of the wavelength meter 51 in which the battery is charged through USB port 80.

Although the present invention has been described in considerable detail with reference to certain preferred versions thereof, other versions would be readily apparent to those of ordinary skill in the art. Therefore, the spirit and scope of the present invention should not be limited to the description of the preferred versions contained herein.

What is claimed is:

1. A handheld wavelength measurement meter for measuring a wavelength of an input light signal passing through an optical fiber, said meter comprising:

a housing dimensioned to be held in an average adult human hand;

an input signal fiber connector extending from said housing and adapted for attachment to the optical fiber such that the input light signal passes therethrough;

a non-stable reference light source disposed within said housing, wherein said non-stable reference light source is adapted to produce a reference light signal having a non-stable wavelength;

a temperature measurement device disposed within said housing, wherein said temperature measurement device is:
  in thermal communication with said non-stable reference light source;
  adapted to determine a temperature of said non-stable reference light source; and
  adapted to produce a temperature related output signal;
an interferometer disposed within said housing, wherein said interferometer:
  is in optical communication with said input signal fiber connector such that the input light signal passes therein;
  is in optical communication with said non-stable reference light source such that the reference light signal passes therein; and
  is adapted to produce a measurement signal output and a reference signal output;
a measurement signal optical to electrical converter disposed within said housing and in the optical path of the measurement signal output, and adapted to produce a measurement electrical signal;
a reference signal optical to electrical converter disposed within said housing and in the optical path of the reference signal output, and adapted to produce a reference electrical signal;
a controller disposed within said housing, wherein said controller is:
  in electrical communication with at least said temperature measurement device and said measurement signal optical to electrical converter; and
  adapted to process at least the temperature related output signal, the measurement electrical signal, and the reference electrical signal to determine a wavelength of the input light signal; and
a user interface disposed upon said housing and in electrical communication with said controller further comprising a frequency multiplier disposed within said housing and in electrical communication with said reference signal optical to electrical converter and said controller, wherein:
  said frequency multiplier is adapted to multiply a frequency of the reference electrical signal;
  said frequency multiplier is adapted to direct a multiplied reference electrical signal to said controller; and
  said controller is further adapted to process the multiplied reference electrical signal to determine the wavelength of the input light signal.

2. The handheld meter as claimed in claim 1, wherein said interferometer comprises:
a motor; and
at least a first and a second retroreflector in physical communication with said motor,
  wherein said first and second retroreflectors are:
  adapted to revolve around said motor;
  in fixed angular relation to one another; and
  disposed in an optical path of the input light signal and the reference light signal during at least a portion of the revolutions of said first and second retroreflectors.

3. The handheld meter as claimed in claim 1, wherein said non-stable reference light source is a DFB laser.

4. The handheld meter as claimed in claim 1, wherein the wavelength of the input light signal is within an input wavelength measurement range and the non-stable wavelength of the reference light signal produced by said non-stable reference light source is within the input wavelength measurement range.

5. The handheld meter as claimed in claim 1, wherein:
said non-stable reference light source comprises a light divider and first and second photodiodes; wherein
  said light divider is adapted to:
    divide the reference light signal into first, second, and third parts;
    direct the first part to said interferometer;
    direct said second and third parts to said first and second photodiodes, respectively; and
  said first and second photodiodes are adapted to:
    measure the intensity of the second and third parts, respectively; and
    direct the second and third parts to said controller; and
  said controller is further adapted to process the second and third parts to determine a wavelength of the input light signal.

6. The handheld meter as claimed in claim 2, wherein said interferometer further comprises:
an input channel signal input in optical communication with said input signal fiber connector;
a reference channel signal input in optical communication with said non-stable reference light source;
at least two collimators disposed in the optical path of the input light signal and the reference light signal;
a beamsplitter disposed in the optical path of the input light signal and the reference light signal and so as to direct at least a portion of the input light signal and the reference light signal onto said first and second retroreflectors during at least a portion of the revolution of said first and second retroreflectors;
at least two mirrors disposed in the optical path of the input light signal and the reference light signal during at least a portion of the revolutions of said first and second retroreflectors;
at least two optical ducts disposed in the optical path of the input light signal and the reference light signal; and
an angled mirror disposed in the optical path of the input light signal and the reference light signal.

7. The handheld meter as claimed in claim 1, further comprising:
at least one optical isolator disposed in the optical path of the input light signal; and
at least two optical couplers disposed in the optical path of the measurement signal output and the reference signal output.

8. The handheld meter as claimed in claim 1, wherein said measurement signal optical to electrical converter and said reference signal optical to electrical converter are photodiodes.

9. A wavelength measurement device for measuring a wavelength of an input light signal passing through an optical fiber and having a wavelength within an input wavelength measurement range, said device comprising:
an input signal fiber connector adapted for attachment to the optical fiber such that the input light signal passes therethrough;
a non-stable reference light source adapted to produce a reference light signal having a non-stable wavelength within the input wavelength measurement range;
an interferometer, wherein said interferometer is:
  in optical communication with said input signal fiber connector such that the input light signal passes therein;

in optical communication with said non-stable reference light source such that the non-stable light signal passes therein; and
adapted to produce a measurement signal output and a reference signal output;
a measurement signal optical to electrical converter disposed in the optical path of the measurement signal output, and adapted to produce a measurement electrical signal;
a reference signal optical to electrical converter disposed in the optical path of the reference signal output, and adapted to produce a reference electrical signal;
a frequency multiplier in electrical communication with said reference signal optical to electrical converter and said controller, wherein said frequency multiplier is adapted to multiply the frequency of the reference electrical signal such that the non-stable wavelength is shorter than the wavelengths within the input wavelength measurement range; and
a controller, wherein said controller is:
in electrical communication with said measurement signal optical to electrical converter and said frequency multiplier; and
adapted to process the measurement electrical signal and a multiplied reference electrical signal to determine the wavelength of the input light signal.

10. The device as claimed in claim 9, wherein said non-stable reference light source is a DFB laser.

11. The device as claimed in claim 9 further comprising:
a housing dimensioned to be held in an average adult human hand, wherein:
said input signal fiber connector extends from said housing; and
said non-stable reference light source, said interferometer, said measurement signal to electrical converter, said reference signal optical to electrical converter, said frequency multiplier, and said controller are disposed within said housing; and
a user interface disposed upon said housing and in electrical communication with said controller, comprising a display and an input device.

12. The device as claimed in claim 9, wherein:
said non-stable reference light source comprises a temperature measurement device, a light divider and first and second photodiodes; wherein
said temperature measurement device is:
in thermal communication with said non-stable reference light source;
adapted to determine a temperature of said non-stable reference light source; and
adapted to produce a temperature related output signal;
said light divider is adapted to:
divide the reference light signal into first, second, and third parts;
direct the first part to said interferometer; and
direct said second and third parts to said first and second photodiodes, respectively; and
said first and second photodiodes are adapted to:
measure the intensity of the second and third parts, respectively; and
direct the second and third parts to said controller.

13. The device as claimed in claim 9, further comprising an interferometer, wherein said interferometer comprises:
a motor; and
at least a first and a second retroreflector in physical communication with said motor,
wherein said first and second retroreflectors are:
adapted to revolve around said motor;
in fixed angular relation to one another; and
disposed in an optical path of the input light signal and the reference light signal during at least a portion of the revolutions of said first and second retroreflectors.

14. The device as claimed in claim 13, wherein said interferometer further comprises:
an input channel signal input in optical communication with said input signal fiber connector;
a reference channel signal input in optical communication with said non-stable reference light source;
at least two collimators disposed in the optical path of the input light signal and the reference light signal;
a beamsplitter disposed in the optical path of the input light signal and the reference light signal and so as to direct at least a portion of the input light signal and the reference light signal onto said first and second retroreflectors during at least a portion of the revolution of said first and second retroreflectors;
at least two mirrors disposed in the optical path of the input light signal and the reference light signal during at least a portion of the revolutions of said first and second retroreflectors;
at least two optical ducts disposed in the optical path of the input light signal and the reference light signal; and
an angled mirror disposed in the optical path of the input light signal and the reference light signal.

15. The device as claimed in claim 9, wherein said measurement signal optical to electrical converter and said reference signal optical to electrical converter are photodiodes.

16. A handheld wavelength measurement meter for measuring a wavelength of an input light signal passing through an optical fiber and having a wavelength within an input wavelength measurement range, said meter comprising:
a housing dimensioned to be held in an average adult human hand;
an input signal fiber connector extending from said housing and adapted for attachment to the optical fiber such that the input light signal passes therethrough;
a reference light source adapted to produce a reference light signal;
an interferometer disposed within said housing, wherein said interferometer:
is in optical communication with said input signal fiber connector such that the input light signal passes therein;
is in optical communication with said reference light source such that the reference light signal passes therein;
is adapted to produce a measurement signal output and a reference signal output; and
comprises rotating mirrors disposed such that the input light signal and the reference light signal reflect thereof;
a measurement signal optical to electrical converter disposed within said housing and in the optical path of the measurement signal output, and adapted to produce a measurement electrical signal; and
a reference signal optical to electrical converter disposed within said housing and in the optical path of the reference signal output, and adapted to produce a reference electrical signal further comprising a frequency multiplier in electrical communication with said reference signal optical to electrical converter, wherein said frequency multiplier is adapted to multiply a frequency of the reference electrical signal such that the wavelength of the reference light source is shorter than the wavelength within the input wavelength measurement range.

17. A wavelength measurement device for measuring a wavelength of an input light signal passing through an optical fiber and having a wavelength within an input wavelength measurement range, said device comprising:
- an input signal fiber connector adapted for attachment to the optical fiber such that the input light signal passes therethrough;
- a reference light source adapted to produce a reference light signal;
- an interferometer, wherein said interferometer:
  - is in optical communication with said input signal fiber connector such that the input light signal passes therein;
  - is in optical communication with said reference light source such that the reference light signal passes therein;
  - is adapted to produce a measurement signal output and a reference signal output; and
  - comprises rotating mirrors disposed such that the input light signal and the reference light signal reflect thereof;
- a measurement signal optical to electrical converter disposed in the optical path of the measurement signal output, and adapted to produce a measurement electrical signal;
- a reference signal optical to electrical converter disposed in the optical path of the reference signal output, and adapted to produce a reference electrical signal; and
- a controller, wherein said controller is:
  - in electrical communication with said measurement signal optical to electrical converter, and
  - adapted to process the measurement electrical signal and the reference electrical signal to determine a wavelength of the input light signal further comprising a frequency multiplier in electrical communication with said reference signal optical to electrical converter, wherein said frequency multiplier is adapted to multiply a frequency of the reference electrical signal such that the wavelength of the reference light source is shorter than the wavelength within the input wavelength measurement range.

* * * * *